United States Patent Office 3,223,843
Patented Dec. 14, 1965

3,223,843
CIRCUIT ARRANGEMENT FOR RADIATION
DOSE-MEASUREMENT
Kurt Westerkowsky, Hamburg-Bramfeld, Germany, assignor to North American Philips Company, Inc., New York, N.Y., a corporation of Delaware
Filed Mar. 28, 1962, Ser. No. 183,078
Claims priority, application Germany, May 26, 1961, M 49,161
11 Claims. (Cl. 250—83.6)

The invention relates to a circuit arrangement for radiation dose-measurement, more particularly to X-ray diagnostic apparatus of the type which measures the dosage of X-rays by means of a measuring capacitor charged through an ionization chamber according to the quantity of radiation.

For recording radiation quantities, ionization chambers are usually arranged within the radiation range. The current flowing through such a chamber is proportional to the radiation intensity. In order to measure radiation quantitatively, this current is used to charge a measuring capacitor. When the measuring capacitor is charged to a predetermined positive voltage a trigger circuit produces a switching pulse which is conducted to a pulse counting device. Simultaneously, the measuring capacitor is discharged to its initial potential by a relay contact so that charging may begin again.

Such a dosage counting arrangement may be provided with a mechanical counting device. However, when the pulses are produced in very quick succession, as is the case in radiography, the mechanical counters do not respond. It is true that electronic counters having suitable counting speeds are known. However, electronic counting devices are very expensive, and to avoid large investments it would be advantageous to use a conventional mechanical counting device.

The present invention enables a conventional mechanical counter to be used in combination with a circuit arrangement for radiation dose-measurements of the type comprising a measuring capacitor. According to the invention, after the radiation source has been switched off, the charging voltage of the measuring capacitor is added to a gradually increasing voltage of opposite polarity. The resulting voltage is operative in the grid circuit of a discharge tube. When the voltage reaches a predetermined value it produces a discharge current to interrupt the increase of the additional voltage. The time in which the additional voltage is built up is used for measuring the radiation quantity.

The circuit arrangement is particularly useful in radiography since in this process only limited amounts of radiation are emitted.

In the circuit arrangement in accordance with the invention, the voltage across the measuring capacitor is measured by increasing the zero potential of the measuring capacitor, for example, by connecting between the said capacitor and earth a further capacitor to which a high voltage is applied and across which the additional voltage is built up.

During the time in which the additional voltage is built up a multivibrator produces pulses which are counted by a counter. Alternatively, the time may be measured with the aid of a clock having a dial or counter which is calibrated in radiation doses. Irrespective of their radiation time, the value to be measured of the amount of electricity stored during the short time irradiation is afterwards converted into a period of time adapted to be readily measured.

In order that the invention may readily be carried into effect, an embodiment thereof will now be described, by way of example, with reference to the accompanying diagrammatic drawings, in which.

Figure 1:
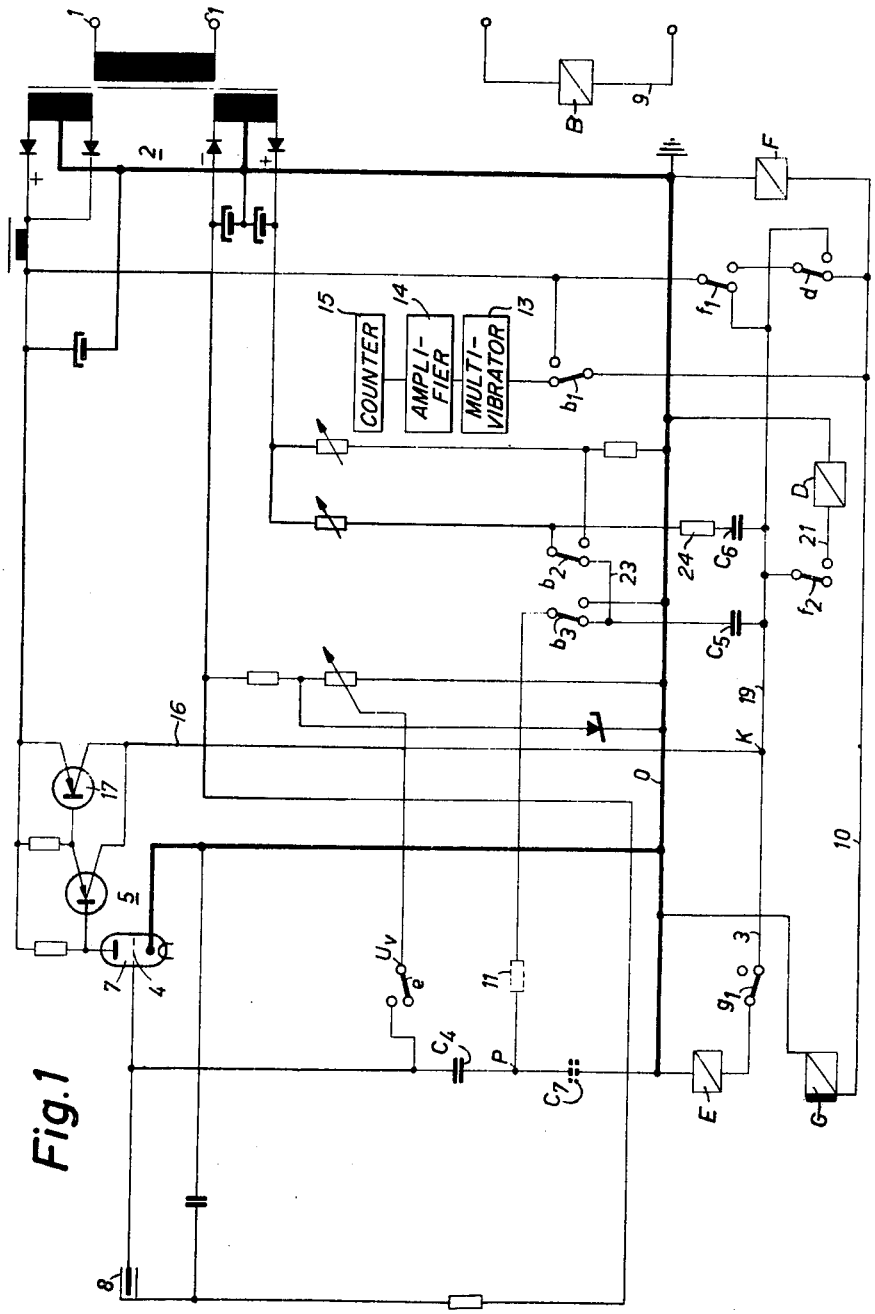
FIGURE 1 shows a circuit arrangement in accordance with the invention.

The supply voltage is applied to terminals 1 of a transformer 2. As a result an electric current flows through a control circuit 3 comprising a contact $f_1$, a contact $g_1$ and a relay E. Consequently, the relay E is energized and closes a contact $e$. One electrode of a capacitor $C_4$ is connected to the control grid 4 of an electrometer tube 7 forming part of a trigger circuit 5. The capacitor electrode and the control grid are at a negative potential $U_v$ with respect to the conductor O which is connected to ground. One electrode of an ionization chamber 8 is connected to the control grid 4 and the second electrode of the ionization chamber 8 is connected to a potential which is negative with respect thereto.

At the beginning of the radiograph, a control relay B connected in a supply lead 9 of a radiation source, not shown, is energized and throws over contacts $b_1$, $b_2$ and $b_3$. As a result, a circuit 10 including relays F and G conducts current via the contact $b_1$, which energizes the relay F of which contacts $f_1$ and $f_2$ are thrown over. The contact $f_1$ completes a holding circuit for the relays F and G. The relay G throws over a contact $g_1$ in control circuit 3. The contact $g_1$ breaks the control circuit 3 so that the relay E is de-energized and the contact $e$ is opened. Consequently, the capacitor $C_4$ is no longer connected to the negative voltage $U_v$. Since on energisation of the relay B the contact $b_3$ was also thrown over, the second electrode of the measuring capacitor $C_4$ is connected to the ground lead O at a point P through a resistor 11. A capacitor $C_7$ shown by broken lines and the resistor 11 act as anti-interference members for compensating surges. These parts are not essential to the operation of the novel circuit arrangement.

From the instant when the relay B is energized and the making of a radiograph is commenced, the ionization chamber 8 is struck by radiation. A charging current flows through the chamber 8 and the capacitor $C_4$. As a result the capacitor $C_4$ is charged and the grid potential of the tube 7 becomes progressively more negative. The negative voltage $U_m$ to which the capacitor $C_4$ is charged on termination of the radiograph is a measure of the amount of radiation by which the chamber 8 has been struck.

When the irradiation is terminated, the relay B connected in the supply lead of the source of radiation is de-energized, either automatically or by a separate control signal, so that the contacts $b_1$, $b_2$ and $b_3$ are again thrown over. The relays F and G remain energized because the control circuit 10 is held closed through the contact $f_1$.

Instead of being connected through resistance 11 to ground potential, the point P between the capacitor $C_4$ and the capacitor $C_7$ is now connected to a positive potential by means of contacts $b_3$ and $b_2$. Point P is also connected through a shunt connection of capacitor $C_5$ in parallel with the series combination of a capacitor $C_6$ and a resistor 24, the control lead 3 and the relay winding D, to ground potential. By this arrangement the potential at point P and consequently also the potential at the grid 4 is gradually driven more positive. The positive supply potential should be so high that the potential increase owing to the charging current may be assumed to be substantially linear.

While a posiive compensating voltage $U_k$ is set up across the capacitor $C_5$ when a charge is being built up, a multivibrator 13 is rendered operative by the contact $b_1$ being thrown over. This multivibrator 13 delivers electrial pulses which, after amplification in an amplifier 14, are counted by a mechanical counter 15.

The sum of the voltages $U_v$, $U_m$ and $U_k$ at the grid 4 approaches the potential of the cathode of the tube 7, which is connected to ground, and after a certain period of time the difference is equal to a potential $U_s$ at which the tube 7 becomes conductive. A transistor amplifier circuit 5 connected to the tube 7 amplifies the tube current. As a result the collector lead 16 of a switching transistor 17 passes current. A point K of the circuit arrangement is thus connected to the amplifier output by means of the switching transistor 17. As a result, a switching current flows through a lead 19 energizing the relay D which throws over the contact $d$. Consequently, the load imposed on the switching transistor 17 is decreased because the contact $d$ closes a circuit which directly supplies the current flowing through the relay D from the current source 2. At the same time current flowing through the control lead 10 is interrupted so that the relays F and G are released and the multivibrator is switched off. Due to the release of relay F, the contacts $f_1$ and $f_2$ are thrown over and the current flowing through the lead 21 connected in series with the relay D is interrupted and hence the relay D is de-energized. The relay G releases with a time delay and finally throws over a contact $g_1$. The contact $g_1$ again completes the circuit for the conrol lead 3. The current flowing through the control lead 3 energizes the relay E and closes the contact $e$ so that the negative potential $U_v$ is again set up at one electrode of the capacitor $C_4$ and at the grid 4 of the tube 7. Thus the steps perparing the apparatus for the making of another radiograph are completed.

It should be noted that the duration of the charge period of capacitor $C_5$ is varied by the choice of the difference between the potentials $U_v$ and $U_s$. The voltage $U_v-U_s$ is a fundamental condition for correct operation of the circuit arrangement. However, since this voltage is introduced into the circuit arrangement as an additive measuring error, it has to be eliminated by a correcting member. Compensation is effected with the aid of the serious combination of a capacitor $C_6$ and a resistor 24 which on termination of the radiograph is connected in parallel with the capacitor $C_5$ between the point P and the control lead 3. The capacitor $C_6$ applies the voltage $U_v-U_s$ to the capacitor $C_5$ through the lead 23 at the instant at which the contact $b_3$ is thrown over.

The multivibrator 13 may be replaced by a clock having a dial or counter which is calibrated in radiation doses. Similarly to the multivibrator, the clock is switched on and off by means of the contact $b_1$.

The capacitor $C_5$ may also be replaced by another circuit element adapted to build up a linearly varying potential. An example of such an element is a variable resistor in which a slider is driven by a motor which moves with a constant speed.

Figure 2:
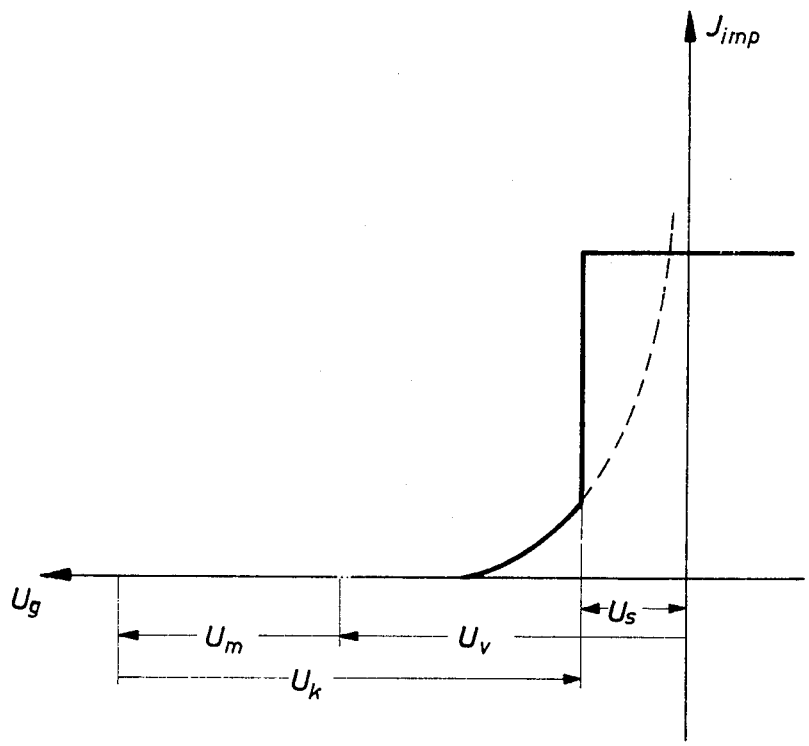
FIGURE 2 is a graph illustrating the current-voltage variation in the trigger circuit of the circuit arrangement.

In the graph shown in FIGURE 2, the current at the output of the trigger circuit 5 is plotted against the voltage distribution $U_g$ at the grid of the trigger tube 7. This diagram clearly shows the voltage variation at the grid 4 which is an essential feature of the invention. At the beginning of the irradiation a negative potential $U_v$ is set up at the grid 4. During the period in which the measuring capacitor $C_4$ is charged, the negative potential is increased by an amount $U_m$ which is proportional to the amount of radiation emitted up to the end of the irradiation process. Then the compensating voltage $U_k$ increases the grid potential and when the voltage $U_s$ is reached the trigger circuit 5 is activated. The resulting current pulse causes the trigger circuit 5 to be switched off and the potenial across the capacitor $C_4$ to be reduced to a value of $U_v$. During the time in which the voltage $U_k$ rises the counter counts the pulses of the multivibrator.

Thus the value of the charging voltage $U_m$ of the capacitor $C_4$ is indicated by the time during which the voltage $U_k$ compensating this charging voltage and the voltage difference between $U_v$ and the trigger voltage $U_s$ is obtained, which time is recorded in the counter 15 by a coresponding number of pulses.

What is claimed is:

1. X-ray measuring apparatus for measuring the energy supplied to a specimen irradiated by a source of X-rays during a first given time period, comprising radiation sensitive means arranged to intercept said radiation during said first time period and convert same into a proportional amount of electrical energy, means coupled to said radiation sensitive means for storing said electrical energy during said first time period, means for providing an indication of the amount of radiation supplied by said X-ray source during said first time period, and control means coupled to said energy storing means for actuating said indicating means at the end of said first time period for a second period of time which is determined by the energy stored during said first time period.

2. X-ray measuring apparatus for measuring the energy supplied to a specimen irradiated by a source of X-rays, comprising radiation sensitive means arranged to intercept said radiation and convert same into a proportional amount of electrical energy, means for storing said electrical energy during a first time period, timing means for providing an indication of the amount of radiation supplied by said X-ray source during said first time period, and control means for actuating said timing means to begin a timing operation at the end of said first time period, said control means further comprising means responsive to the amount of energy stored in said storage means during said first time period for controlling the duration of said timing operation for a second period of time proportional thereto.

3. X-ray measuring apparatus for measuring the energy supplied to a specimen irradiated by a source of X-rays, comprising an ionization chamber for producing an electrical current proportional thereto during a first time period, an integrating capacitor coupled to said ionization chamber for storing an electrical charge of a given polarity during said first time period, timing means for producing an indication of the amount of radiation supplied by said X-ray source, a trigger circuit, control means for actuating said timing means to begin a timing operation at the end of said first time period, said control means comprising means for producing a varying voltage of opposite polarity to said given polarity and means for combining said varying voltage and said stored charge and supplying same as a control input to said trigger circuit, said trigger circuit being responsive to the combined voltages at its control input for supplying a control signal to said timing means thereby to terminate said timing operation after a period of time determined by the charge stored on said capacitor.

4. X-ray apparatus for measuring the amount of radiation irradiating a specimen by a source of X-rays, comprising radiation sensitive means responsive to said radiation for producing an electrical current proportional thereto, an integrating capacitor coupled to said radiation sensitive means for storing an electrical charge during the energization period of said X-ray source, timing means for providing an indication of the amount of radiation supplied by said X-ray source during said energization period, a trigger circuit having a control input terminal, means for actuating said timing means to begin a timing operation at the termination of said energization period, a second capacitor, a source of voltage for charging said second capacitor, control means for selectively connecting said second capacitor to said source of voltage and to said integrating capacitor at the termination of said energization period, means for connecting said integrating capacitor and said second capacitor to said trigger circuit control input with opposed polarities thereby to provide a varying input voltage to said control input, said trigger circuit being responsive to the combined voltages at its control input for supplying a control signal to said timing means thereby to terminate said timing operation after a period of time determined by the charge stored on said integrating capacitor.

5. Apparatus as described in claim 4 wherein said timing means comprises a pulse generator supplying pulses to a counter and wherein said control means further comprises switch means for selectively operating said counter at the termination of an energization period and stopping said counter in response to said trigger circuit control signal.

6. Apparatus as described in claim 5 wherein said control means further comprises second switch means for selectively connecting said integrating capacitor in series with said second capacitor in one position of said second switch means and to a point of reference potential in a second position thereof.

7. Apparatus as described in claim 5 further comprising a resistance element in series with said voltage source and said second capacitor whereby said second capacitor is linearly charged during said timing operation.

8. Apparatus as described in claim 5 wherein said control means further comprises third switch means for selectively connecting said integrating capacitor and said trigger circuit control input to a source of bias voltage at the end of said timing operation.

9. X-ray apparatus for measuring the amount of radiation produced by an X-ray source during a given energization period, comprising a radiation detector responsive to said radiation for producing an electrical current proportional thereto, a trigger circuit having a control input terminal, electrical energy storage means coupled to said control input terminal and to said radiation detector for storing an electrical charge determined by the amount of said radiation produced during said energization period, timing means for providing an indication of the amount of radiation supplied by said X-ray source during said energization period, circuit means selectively operable to provide a progressively varying voltage, control means responsive to a given condition of said X-ray source for actuating said timing means and said circuit means at the termination of said energization period, and means for applying said progressively varying voltage to said trigger circuit control input so as to oppose the electrical charge stored in said enerby storage means, said trigger circuit being responsive to the combined voltages at its control input for producing a control signal for said timing means thereby to terminate said timing operation after a period of time determined by the charge stored in said energy storage means.

10. Apparatus as described in claim 9 wherein said timing means comprises a pulse generator and pulse counting means responsive thereto, and wherein said circuit means includes a capacitor which is selectively connected in circuit with said energy storage means at the end of an energization period and which is disconnected therefrom during said energization period.

11. Apparatus as described in claim 10 wherein said control means further comprises switch means for connecting said trigger circuit control input to a source of negative bias voltage at the end of a timing operation and for disconnecting said control input from said bias voltage at the beginning of an energization period.

References Cited by the Examiner
UNITED STATES PATENTS

| | | | |
|---|---|---|---|
| 2,883,554 | 4/1959 | Reed et al. | 250—95 |
| 2,984,746 | 5/1961 | Speh et al. | 250—83.6 X |
| 2,985,761 | 5/1961 | Ohmart | 250—95 |
| 3,012,146 | 12/1961 | Hamelink | 250—83.6 |
| 3,065,349 | 11/1962 | Achtellik et al. | 250—83.6 |

RALPH G. NILSON, *Primary Examiner.*

ARCHIE BORCHELT, *Examiner.*